United States Patent [19]

Schulze et al.

[11] Patent Number: 5,557,086
[45] Date of Patent: Sep. 17, 1996

[54] GAME MACHINE SYSTEM WITH MONEY-PROCESSING STATION

[75] Inventors: Ullrich Schulze, Wiesbaden; Horst Niederlein; Hans-Joachim Pickardt, both of Bingen, all of Germany

[73] Assignee: NSM Aktiengesellschaft, Bingen, Germany

[21] Appl. No.: 290,948

[22] PCT Filed: Feb. 25, 1993

[86] PCT No.: PCT/DE93/00178

§ 371 Date: Aug. 22, 1994

§ 102(e) Date: Aug. 22, 1994

[87] PCT Pub. No.: WO93/17403

PCT Pub. Date: Sep. 25, 1993

[30] Foreign Application Priority Data

Feb. 26, 1992 [DE] Germany ............... 42 05 791.4

[51] Int. Cl.⁶ .................................................. G06K 5/00
[52] U.S. Cl. ................................................. 235/380; 902/23
[58] Field of Search ............................... 235/380, 382, 235/382.5; 364/411, 412; 902/23; 273/269, 237; 194/318

[56] References Cited

U.S. PATENT DOCUMENTS

| | | | |
|---|---|---|---|
| 4,575,622 | 3/1986 | Pellegrini | 235/382 |
| 4,636,951 | 1/1987 | Harlick | 902/23 X |
| 4,825,378 | 4/1989 | Yuge | 364/478 |
| 4,953,086 | 8/1990 | Fakatsu | 364/408 |
| 5,083,271 | 1/1992 | Thacher et al. | 364/411 |
| 5,154,272 | 10/1992 | Nishiumi et al. | 194/318 |
| 5,265,874 | 11/1993 | Dickinson et al. | 902/23 X |
| 5,326,104 | 7/1994 | Pease et al. | 902/23 X |
| 5,371,345 | 12/1994 | Lestrange et al. | 902/23 X |

FOREIGN PATENT DOCUMENTS

| | | | |
|---|---|---|---|
| 391218 | 2/1990 | Austria | 235/380 |
| 0360613 | 3/1990 | European Pat. Off. | 235/380 |
| 3441518 | 5/1986 | Germany | 235/380 |
| 4035022 | 5/1992 | Germany | 235/380 |

Primary Examiner—Donald T. Hajec
Assistant Examiner—Thien Minh Le
Attorney, Agent, or Firm—Spencer & Frank

[57] ABSTRACT

A game machine system comprising a plurality of game machines networked with one another. Each of the game machines includes: a reading device for reading an encoded user card; and a display for displaying a credit value read from the encoded user card; a safe-like housing structurally separate from the game machines; and a computer-controlled money processing device disposed in the housing and networked with the game machines. The money processing device includes a money deposit unit; a money storage device; a stock of user cards in the form of chip cards each having a non volatile chip memory and being value coded; an encoding device for encoding each of the user cards with the credit value belonging to an corresponding user; an acquisition unit for acquiring money deposited through the money deposit unit and allocating the credit value belonging to the corresponding user to both the storage device and the encoding device; a card dispenser; a releasing device for releasing a selected one of the game machines into which an encoded user card has been received; and a checking device for cyclically updating playing data including game statistics and credit values.

18 Claims, 2 Drawing Sheets

GAME MACHINE SYSTEM WITH MONEY-PROCESSING STATION

BACKGROUND OF THE INVENTION

The invention relates to a game machine system, comprising a number of game machines that are networked with one another and have a reading device for user cards, and a computer-controlled unit which stores the user credit or the credit value belonging to the user, and, with sufficient corresponding credit, releases a game machine after reading a user card, and updates the credit according to the playing data transmitted from the game machine. The playing data including credit values, game statistics including scores, turnover, special games information, and the like.

A game machine system of this type described in DE-C-3,441,518 is based on the use of a user card that contains value information, i.e. a credit. The corresponding data are read into a memory of a data-processing station, and memory and game arcade information are printed on the user card. This user card can then be inserted into the different networked game machines, whereupon the computer respectively compares the necessary credit with the stored credit, and when a sufficient amount of credit exists, generates a release signal. Following this, the user card is returned, and the appropriate game machine can be used. If the user has ended playing operation, the user card is reread and checked by the computer. The final credit is written on the user card in a corresponding memory device, and the credit data stored in the computer-controlled unit are erased. Alternatively, the credit present following a validity check by the computer can also be erased, and the corresponding sum paid out.

A constant problem associated with coin-operated machines is stocking coins and bills in the machine, because security precautions must be taken against manipulation and theft. The appropriate security devices are becoming increasingly expensive, and in this manner increase the production costs of the individual machines.

To increase the security of money-operated entertainment machines, it has become known in the meantime to combine a plurality of money-operated entertainment machines into a machine group. The machine group can then be played simultaneously by one player. Departing from this, an arrangement of money-operated entertainment machines has already been proposed, in which the machines are connected to one another in a predetermined number to form a group, and can be played by means of a common, computer-controlled money-processing device having a money slot and money return; the money slot and money return are accommodated in a separate, safe-like central housing. This is described in the DE-A-4,035,022.

In this way, the individual entertainment machines need not be provided with coin testers, bill testers, coin stores, bill stores, coin return devices, bill return devices and/or credit card readers. Considerable cost savings could be achieved.

The object of the invention is to disclose a game machine system that permits completely automatic operation of all of the game machines while meeting a high security standard for stocking and paying out money, and which at the same time can be produced cost-effectively.

SUMMARY OF THE INVENTION

According to the invention, therefore, a game machine system has been developed which encompasses a number of game machines that are networked with one another and have a reading device for user cards and a computer-controlled unit that stores the credit of the user, and, following the reading of a user card, releases a game machine when a sufficient, corresponding credit is present and updates the credit corresponding to the playing data transmitted from the game machine. The computer-controlled unit is a computer-controlled money-processing device that is networked with the game machines and has a deposit unit and a return unit accommodated in a separate, safe-like central housing, and includes a store for user credit. Furthermore, the money-processing device has an acquisition unit for a sum deposited by way of the deposit unit; a deposited sum is stored in the store for user credit, and a user card having a code which corresponds to the stored user credit is dispensed by way of the card dispenser.

The game machine system according to the invention thus makes use of the advantages of the game machine network, i.e. the statistics and all other data of the individual game machines in particular can be evaluated automatically, and the individual machines need not include their own evaluation device. Moreover, in the game machine system according to the invention, a data transfer takes place between the individual game machines and the computer-controlled unit, i.e. game information is supplied to the computer-controlled unit, and credit or monetary value information is transmitted in both directions, that is, bidirectionally. This permits alternate playing of the individual game machines without practical money transactions being necessary. This is made possible through the utilization of user cards, which assure the allocation of the respective user to a corresponding credit in the computer-controlled unit. The necessary security of the cash held for safekeeping in the game machine system is assured in that the money-processing device is accommodated in a separate, safe-like central housing. In this way, the money-processing information can be automatically further transmitted to the machines via the network. Moreover, the game machines, which can be configured as money-operated game machines, pinball machines, darts game machines, video game machines, jukeboxes and the like, can alternatingly have or not have their own money-processing system. Furthermore, the option exists of integrating game machines already found on the market into the game machine system according to the invention in the simplest manner because, after disassembly of the money-processing system and installation of the user card-reading device, the coin insertion slot associated with these machines can be used as a user card insertion slot. Of course, it is also possible to integrate game machines that have their own money-processing system into the game machine system.

The money-processing device has a deposit unit and a return unit provided for coins and bills; the deposited money can be supplied by way of sorting devices to individual, monetary value-specific return containers of the return unit. If a user wishes to put one of the game machines into playing operation, at the outset he must deposit by way of the money-processing machine a specific sum for a credit which is then credited to him, and he receives a user card corresponding to this credit via the card dispenser of the money-processing device. By means of the coded user card, the players can play the different machines and, depending on the equipment of the machines, read the still-available credit off of a display. Although it is provided that all of the machines are initiated by means of the computer-controlled money-processing device, it is still possible to connect machines provided with a separate money return device. However, it is important that the coded user cards make it possible to be able to provide a spatial distance suitable for the machines between the individual game machines and the central money-processing device, i.e. the actual security container and safe are separate from the playing operation. Moreover, the money-processing device can preferably be used strictly as a change machine.

The credit of the player in the money-processing device is advisably posted to the selected game machine by means of the user card-reading device of the selected game machine of the game machines networked with one another, and playing can proceed on the basis of this credit.

The flexibility of the users is preferably improved when the game machines networked with one another each have a display which, when a user card is located in its reading device, displays the credit associated with the card and stored in the money-processing device, with the representation of the credit being graduated, as the case may be.

A plurality of game machines can preferably be played simultaneously with one user card, in which instance the sum of score and credit present in each game machine is fed back into the money-processing device through the operation of a feedback key, thus ending the game. As an alternative to the above, it is advisably provided that a plurality of game machines can be played simultaneously with one user card, in which case the sum of score and credit present in each game machine is fed back into the money-processing device after reinsertion of the user card and operation of a key to end the game. The credit amount and the score total are thus always carried along. The game is ended by means of a keystroke, so that the total sum is fed back, or by means of reinsertion of the user card and a keystroke in order to ensure that the code is also fed back.

An advantageous embodiment of the game machine system according to the invention includes a card-reading device, in which a read code of a user card located in the card-reading device is compared with the user code for credit present in the store for user credit, and, in the presence of an associated credit and deposit of a sum into the deposit unit, this sum is added to the stored amount of credit. In this way it is possible that, with greater use or decreasing credit, the credit can be increased without it being necessary to open a new credit or account.

As protection against manipulation, particularly on the user card, it can be provided for the money-processing device to have a device for erasing user codes and the associated credit at established points in time. For example, the erasure can be performed in the evening after playing operation has ended. This then forces the players to withdraw their credit from the money-processing device upon leaving the game arcade or, in any case, the area of the machine. The credit stored in the money-processing device at the end of playing operation is thus the actual, current sum of money based on which the day's accounting can be calculated.

The money-processing device also advisably has a display that displays the stored credit associated with a user card located in the card-reading device. In this way the player can always check the amount of the credit periodically and increase it as needed.

Magnetic cards in which the credit and the score are carried along via the code of the magnetic card can be employed as user cards. As an alternative to this, the user card can be a chip card that has a non-volatile chip memory, for example an EEPROM, which is value-coded, and in which the credit on the chip card and the score are carried along via the code of the chip card in the money-processing device. In this instance the chip cards can be dispensed by the money-processing device in graduated value units. For example, a chip card for one dollar and a chip card for two dollars can be purchased for a deposit of three dollars. Two different game machines can then be played with these chip cards.

The evaluation of the game machine system according to the invention is improved in that the money-processing device encompasses a checking device by means of which the game machine data, such as statistic, turnover, special games, special game series and the like, can be acquired cyclically. By means of the above, a function check can be performed throughout the day.

Furthermore, the money-processing device preferably includes an alarm device that has an automatic machine shutdown, an error message device that has an automatic machine shutdown, a personnel monitoring device, a price-setting device and, as the case may be, further monitoring devices. Moreover, the money-processing device advisably has a data acquisition device for ascertaining master players who obtain a bonus with the user card.

The money-processing device preferably has either an interface for connection to a computer, or an internal computer. The computer can be, for example, a personal computer that has an external or internal operator console, by means of which all of the money transactions can be handled in the game arcade.

A central evaluation of the game machine system is permitted in that the money-processing device has an interface for remote data transmission to a home personal computer via a modem.

In an alternative embodiment of the invention, in which the individual game machines are not networked with one another, the game machines can preferably be played with a chip card drawn from the money-processing device, in which case the score (point tally, free games, special games and the like) and the attained credit are always transferred onto the chip card at the end of the game and, finally, the attained credit can be retrieved from the money-processing device. In this way the credit amount and score total, which can consist of different types of scores, are always carried along via the chip card.

The networking of the game machines can be advisably effected by means of machine-specific interfaces (revisor boards).

BRIEF DESCRIPTION OF THE DRAWINGS

The invention is described in detail below by way of two embodiments, which are shown in the drawing. Shown are in.

DETAILED DESCRIPTION OF THE INVENTION

Figure 1:
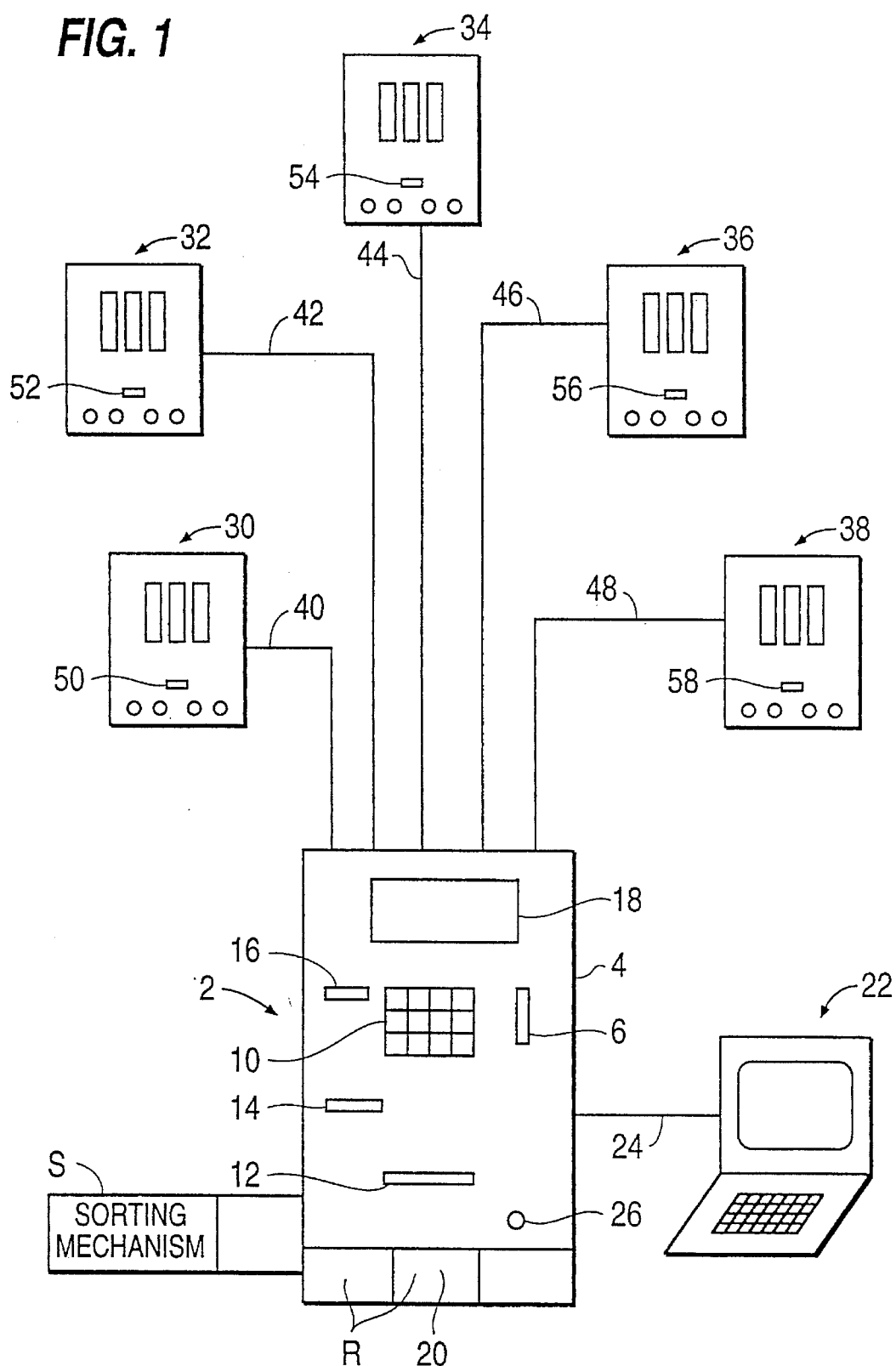
FIG. 1 a game machine system having networked game machines and a computer-controlled money-processing device.

A money-processing device 2 is provided with a safe-like housing 4. A coin slot 6 for depositing coins is provided in the right central region of the front plate. A keyboard 10 is provided for the entry of commands or control data. A slot 12 serves as a card intake for the card-reading device. A bill return 14, above which a bill deposit 16 of a bill tester is disposed, is located in the left region of the front plate. A display 18 is located above the bill return 16, the keyboard 10 and the coin slot 6. The lowest region of the housing 4 encompasses a return 20 including return containers R for coin return or change return, and the user card dispenser. A sorting mechanism S sorts coins and bills into containers R according to their monetary value.

The money-processing device 2 is provided with an interface, not shown, for connection to a computer 22 via a line 24. The computer 22 is a personal computer that serves as a central control, and it is by means of this computer that all of the money transactions of a game machine system controlled by it can be handled in connection with the money-processing device.

A number of game machines 30, 32, 34, 36, 38, which are networked with one another, are connected to the money-processing device 2 via lines 40, 42, 44, 46, 48. The game machines 30, 32, 34, 36 are all equipped with a slot 50, 52, 54, 56, 58 for a user card.

In the above-described game machine system, playing operation takes place in the following manner. By way of deposits 6, 16, a player deposits a certain sum for a credit to be administered by the money-processing device 2, and obtains a user card that has a specific code for identification, which permits an allocation to the appropriate credit. If the player now wishes to play, he inserts the user card into the associated slot 50, 52, 54, 56 or 58, respectively, of the selected game machine 30, 32, 34, 36 or 38. The credit of the player in the money-processing device 2 is posted to the appropriate game machine via the line 40, 42, 44, 46 or 48, and playing proceeds on the basis of this credit. Upon removal of the user card from the slot of the selected game machine, the scores attained at the game machine and the remaining credit are again credited to the player account in the money-processing device 2. If the remaining amount of the credit is insufficient, the relevant playing operation of the machine is not permitted. This means that the user card has the function of an electronic key in the sense of a release device.

The player can change from game machine to game machine without any special effort, and play on the basis of a single credit allocated to the entire system, so that he is not at all concerned with money manipulation and can concentrate fully on playing.

If the player has decided that he does not wish to play further, he can insert his user card into the slot 12 of the money-processing device 2 and, by means of the operating key 26, bring about money return. The user card is then erased and can be re-used. Thus, it can be supplied to the card stock.

Figure 2:
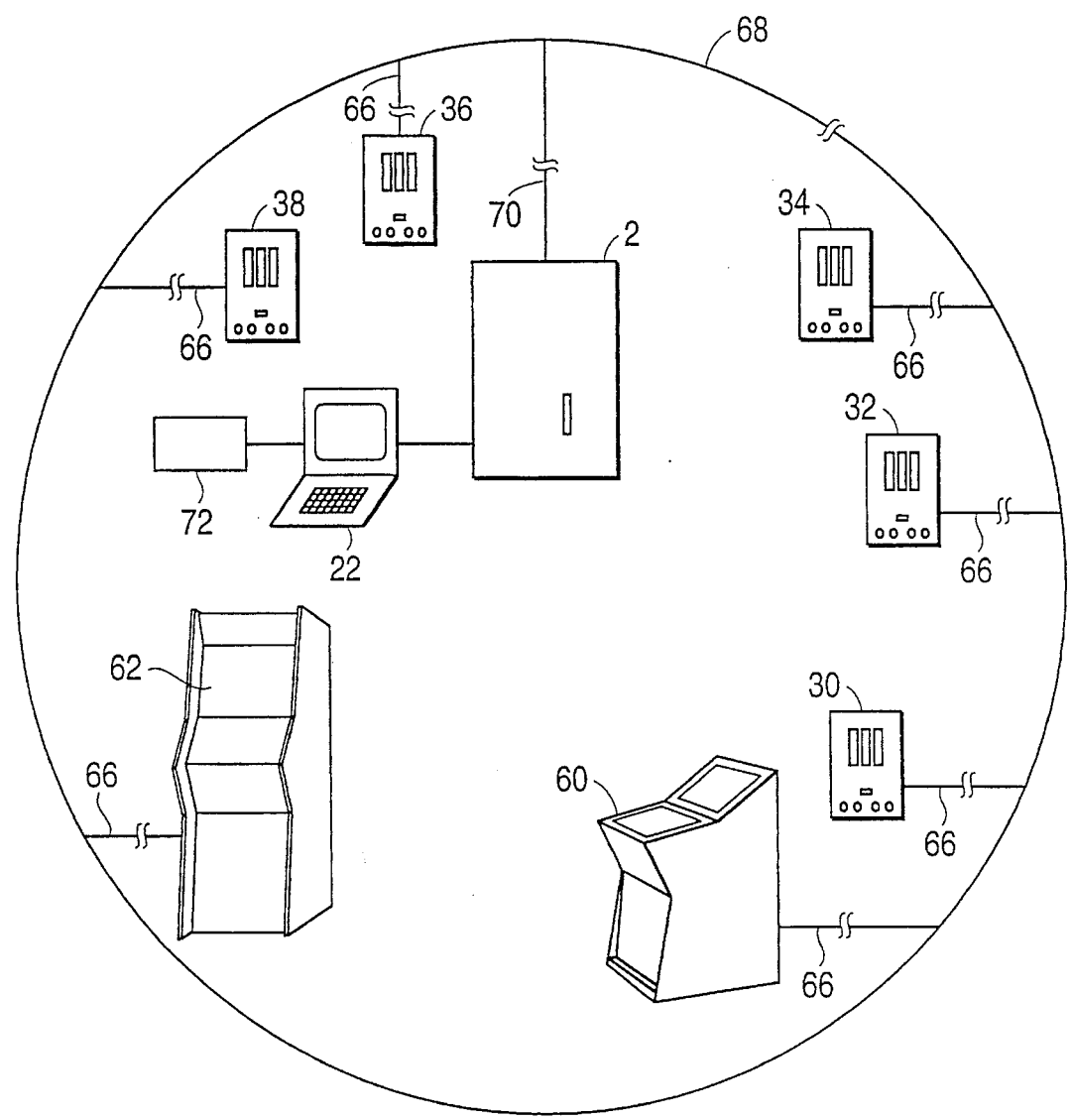
FIG. 2 a game machine system according to FIG. 1 equipped with a ring loop.

In the embodiment of the game machine system illustrated in FIG. 2, the game machines 30, 32, 34, 38, configured as money-operated game machines, and the game machines 60, 62, configured as jukeboxes or video game machines, are respectively connected via a stub 66 to a ring loop 68, from which a further stub 70 leads to the money-processing device 2. A personal computer 22 and a modem 72 are connected to the money-processing device 2. The ring loop can be positioned by means of burying; in this way it is hidden so as to be manipulation-proof. In addition, if the machine breaks down, it can easily be removed from the game machine system for repair purposes by detaching the stub 66 from the ring loop 68.

The above description clearly shows that, on the one hand, the player need not deposit more money at each game machine and, on the other hand, that the machine proprietor need not stock money in and secure each game machine. Rather, the central money-processing permits all of the coin and bill stocks to be kept in its safe.

In their different embodiments, the features of the invention disclosed in the above description and shown in the drawings can be essential for the realization of the invention, both individually and in random combination.

To summarize, the computer-controlled unit is a computer-controlled money-processing device that has a deposit unit and a return unit, which are accommodated in a separate, safe-like central housing, and includes a storage for user credit. Further, the money-processing device has an acquisition unit for a sum deposited by way of the deposit unit; a deposited sum is stored in the store for user credit, and a user card having a code that corresponds to the stored user credit is dispensed via the card dispenser. In this case it is also possible to operate a plurality of game machines simultaneously with one user card if the game machines are appropriately equipped. Moreover, the money-processing device can be operated strictly as a change machine.

We claim:

1. A game machine system comprising:
  a plurality of game machines networked with one another and adapted to be used with a single encoded user card, each of the game machines including:
    a reading device for reading an encoded user card; and
    a display for displaying a credit value read from the encoded user card inserted into a corresponding reading device, the display being adapted to display the credit value in graduated form;
  a safe like housing structurally separate from the plurality of game machines; and
  a computer-controlled money processing device disposed in the housing and networked with the game machines, the money processing device including:
    a money deposit unit adapted to receive money therethrough;
    means operatively associated with the money deposit unit for storing a credit value belonging to a user based on the money deposited through the money deposit unit;
    a stock of user cards operatively associated with the money deposit unit, the user cards being chip cards each having a non volatile chip memory and being value coded;
    an encoding device operatively associated with the stock of user cards for encoding each of the user cards with the credit value belonging to an corresponding user based on the money deposited through the money deposit unit thereby creating an encoded user card;
    an acquisition unit operatively associated with the money deposit unit, the means for storing and the encoding device for acquiring money deposited through the money deposit unit and allocating the credit value belonging to the corresponding user based on the money deposited through the money deposit unit to both the means for storing and the encoding device for both storage of the credit value by the means for storing and encoding of the credit value onto a user card by the encoding device;
    a card dispenser operatively associated with the stock of user cards and adapted to dispense encoded user cards therefrom, the reading device of each of the game machines being adapted to receive an encoded user card dispensed from the card dispenser for reading the encoded user card;

means for releasing, for use by the user, a selected one of the game machines into which an encoded user card has been received, the means for releasing being operatively connected to the reading device of each of the game machines and being responsive to a sufficient credit value read from the encoded user card by the reading device of the selected one of the game machines, the sufficient credit value corresponding to the selected one of the game machines; and a checking device operatively connected to the means for storing for cyclically updating playing data including game statistics and credit values stored by the means for storing according to playing data transmitted from the selected one of the game machines to the means for storing as a result of use of the selected one of the game machines by the user.

2. The game machine according to claim 1, wherein the money processing device further includes:

a money return unit disposed in the housing for returning money to the user;

a feedback key operatively associated with the checking device, the feedback key being actuatable for transmitting playing data from each of the game machines used by the user to the means for storing at the end of a game;

means for erasing both user codes and corresponding credit values from the means for storing;

an alarm device having an automatic shutdown mechanism;

an error message device having an automatic shutdown mechanism;

a plurality of monitoring devices including a personal monitoring device; and a price setting device.

3. The game machine system according to claim 2, wherein:

the money deposit unit and the money return unit are adapted to receive at least one of coins and bills therein, the money return unit including monetary value specific return containers; and the money processing device further comprises sorting means for sorting at least one of the coins and the bills into the monetary value specific return containers of the return unit.

4. The game machine system according to claim 2, wherein the money processing device further includes:

a card intake for insertion of encoded user cards into the money processing device; and means responsive to reinsertion of an encoded user card into the card intake for transmitting playing data as a result of actuation of the feedback key.

5. The game machine system according to claim 1, wherein:

each of the user cards is adapted to be encoded with a user code corresponding to a given user;

the means for storing is adapted to store user codes corresponding to a plurality of users;

the money processing device further includes:

a card intake for insertion of encoded user cards into the money processing device; and a reading device operatively associated with the card intake for reading an encoded user card inserted into the money processing device through the card intake for comparing a user code and a credit value encoded on the encoded user card with user codes and credit values stored by the means for storing; and the encoding device further includes means for encoding a credit value based on additional money deposited through the money deposit unit onto the encoded user card inserted into the money processing device through the card intake.

6. The game machine system according to claim 5, wherein the money processing device further includes a display for displaying the credit value read from an encoded user card inserted into the reading device of the money processing device.

7. The game machine according to claim 1, wherein the money processing device further includes a data acquisition device for acquiring playing data regarding master users who obtain a bonus with their user cards.

8. The game machine according to claim 1, wherein the money processing device further includes one of an interface for connection to a computer and an internal computer.

9. The game machine according to claim 1, further including machine specific interfaces comprising revisor boards for networking the game machines.

10. The game machine according to claim 1, wherein the chip cards are effective for transmitting playing data to the money processing device.

11. The game machine according to claim 1, wherein the chip cards are adapted to be encoded with graduated value units before being dispensed by the card dispenser.

12. The game machine according to claim 1, wherein the money processing device is selectively operable strictly as a change machine.

13. A game machine system comprising:

a plurality of game machines networked with one another, each of the game machines including a reading device for reading an encoded user card and a display for displaying a credit value read from the encoded user card inserted into a corresponding reading device, the game machines further being adapted to be used with a single encoded user card;

a safe-like housing structurally separate from the plurality of game machines; and a computer-controlled money processing device disposed in the housing and networked with the game machines, the money processing device including:

a money deposit unit adapted to receive money therethrough;

means operatively associated with the money deposit unit for storing a credit value belonging to a user based on the money deposited through the money deposit unit;

a stock of user cards operatively associated with the money deposit unit;

an encoding device operatively associated with the stock of user cards for encoding each of the user cards with the credit value belonging to an corresponding user based on the money deposited through the money deposit unit thereby creating an encoded user card;

an acquisition unit operatively associated with the money deposit unit, the means for storing and the encoding device for acquiring money deposited through the money deposit unit and allocating the credit value belonging to the corresponding user based on the money deposited through the money deposit unit to both the means for storing and the encoding device for both storage of the credit value by the means for storing and encoding of the credit value onto a user card by the encoding device;

a card dispenser operatively associated with the stock of user cards and adapted to dispense encoded user cards therefrom, the reading device of each of the game machines being adapted to receive an encoded user card dispensed from the card dispenser for reading the encoded user card;

means for releasing, for use by the user, a selected one of the game machines into which an encoded user card has been received, the means for releasing being operatively connected to the reading device of each of the game machines and being responsive to a sufficient credit value read from the encoded user card by the reading device of the selected one of the game machines, the sufficient credit value corresponding to the selected one of the game machines; and means operatively connected to the means for storing for updating the credit value stored by the means for storing according to playing data transmitted from the selected one of the game machines to the means for storing as a result of use of the selected one of the game machines by the user;

an internal computer operatively associated with the money processing device;

an external console operatively associated with the computer; and an interface for connecting the console to the computer.

14. The game machine system according to claim 13, wherein the user cards are magnetic cards.

15. The game machine system according to claim 14, wherein the magnetic cards are effective for transmitting playing data to the money processing device.

16. The game machine according to claim 13, wherein the money processing device further includes:

a money return unit disposed in the housing for returning money to the user;

a feedback key operatively associated with the means for updating, the feedback key being actuatable for transmitting playing data from each of the game machines used by the user to the means for storing at the end of a game;

means for erasing both user codes and corresponding credit values from the means for storing;

an alarm device having an automatic shutdown mechanism;

an error message device having an automatic shutdown mechanism;

a plurality of monitoring devices including a personal monitoring device; and a price setting device.

17. A game machine system comprising:

a plurality of game machines networked with one another and adapted to be used with a single encoded user card, each of the game machines including:
 a reading device for reading an encoded user card; and
 a display for displaying a credit value read from the encoded user card inserted into a corresponding reading device, the display being adapted to display the credit value in graduated form;

a safe-like housing structurally separate from the plurality of game machines; and a computer-controlled money processing device disposed in the housing and networked with the game machines, the money processing device including:
 a money deposit unit and adapted to receive money therethrough;

means operatively associated with the money deposit unit for storing a credit value belonging to a user based on the money deposited through the money deposit unit;

a stock of user cards;

an encoding device operatively associated with the stock of user cards for encoding each of the user cards with the credit value belonging to an corresponding user based on the money deposited through the money deposit unit thereby creating an encoded user card;

an acquisition unit operatively associated with the money deposit unit, the means for storing and the encoding device for acquiring money deposited through the money deposit unit and allocating the credit value belonging to the corresponding user based on the money deposited through the money deposit unit to both the means for storing and the encoding device for both storage of the credit value by the means for storing and encoding of the credit value onto a user card by the encoding device;

a card dispenser operatively associated with the stock of user cards and adapted to dispense encoded user cards therefrom, the reading device of each of the game machines being adapted to receive an encoded user card dispensed from the card dispenser for reading the encoded user card;

means for releasing, for use by the user, a selected one of the game machines into which an encoded user card has been received, the means for releasing being operatively connected to the reading device of each of the game machines and being responsive to a sufficient credit value read from the encoded user card by the reading device of the selected one of the game machines, the sufficient credit value corresponding to the selected one of the game machines;

means operatively connected to the means for storing for updating the credit value stored by the means for storing according to playing data transmitted from the selected one of the game machines to the means for storing as a result of use of the selected one of the game machines by the user;

a modem; and an interface for remote data transmission to a home personal computer through the modem.

18. The game machine according to claim 17, wherein the money processing device further includes:

a money return unit disposed in the housing for returning money to the user;

a feedback key operatively associated with the means for updating, the feedback key being actuatable for transmitting playing data from each of the game machines used by the user to the means for storing at the end of a game;

means for erasing both user codes and corresponding credit values from the means for storing;

an alarm device having an automatic shutdown mechanism;

an error message device having an automatic shutdown mechanism;

a plurality of monitoring devices including a personal monitoring device; and a price setting device.

* * * * *